J. M. ROE.
VALVE CONTROLLING MECHANISM
APPLICATION FILED OCT. 1, 1906.
951,340.
Patented Mar. 8, 1910.
4 SHEETS—SHEET 1.
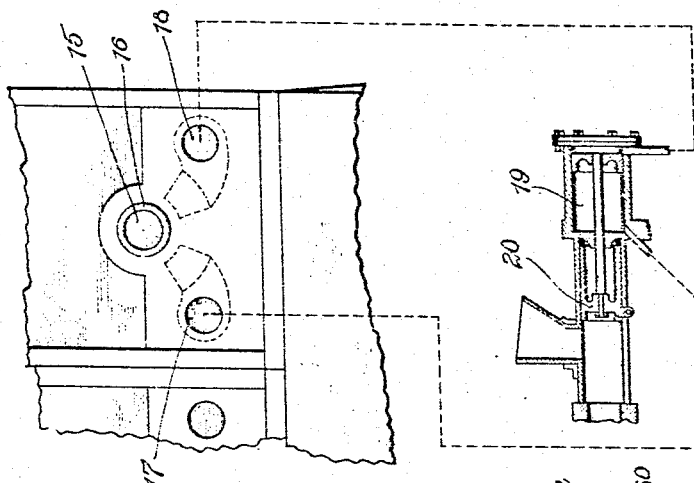
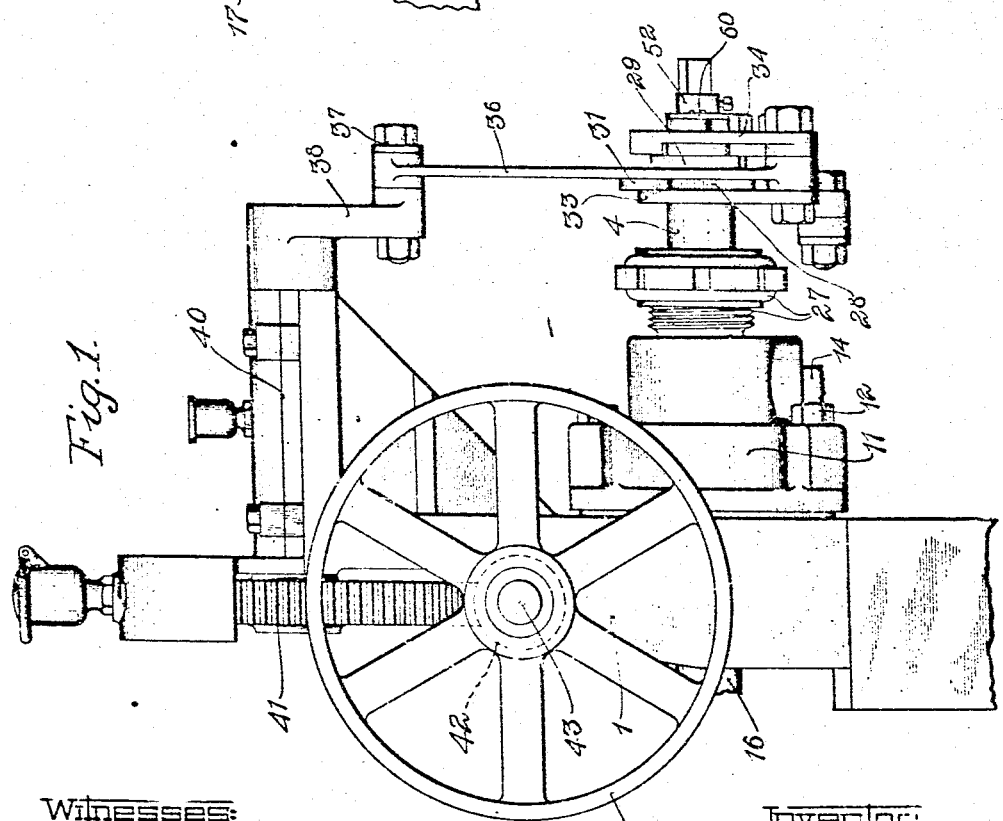
Witnesses:
Arthur H. Boettcher,
Charles J. Schmidt.
Inventor:
John M. Roe
By Charles A. Brown
Attorney

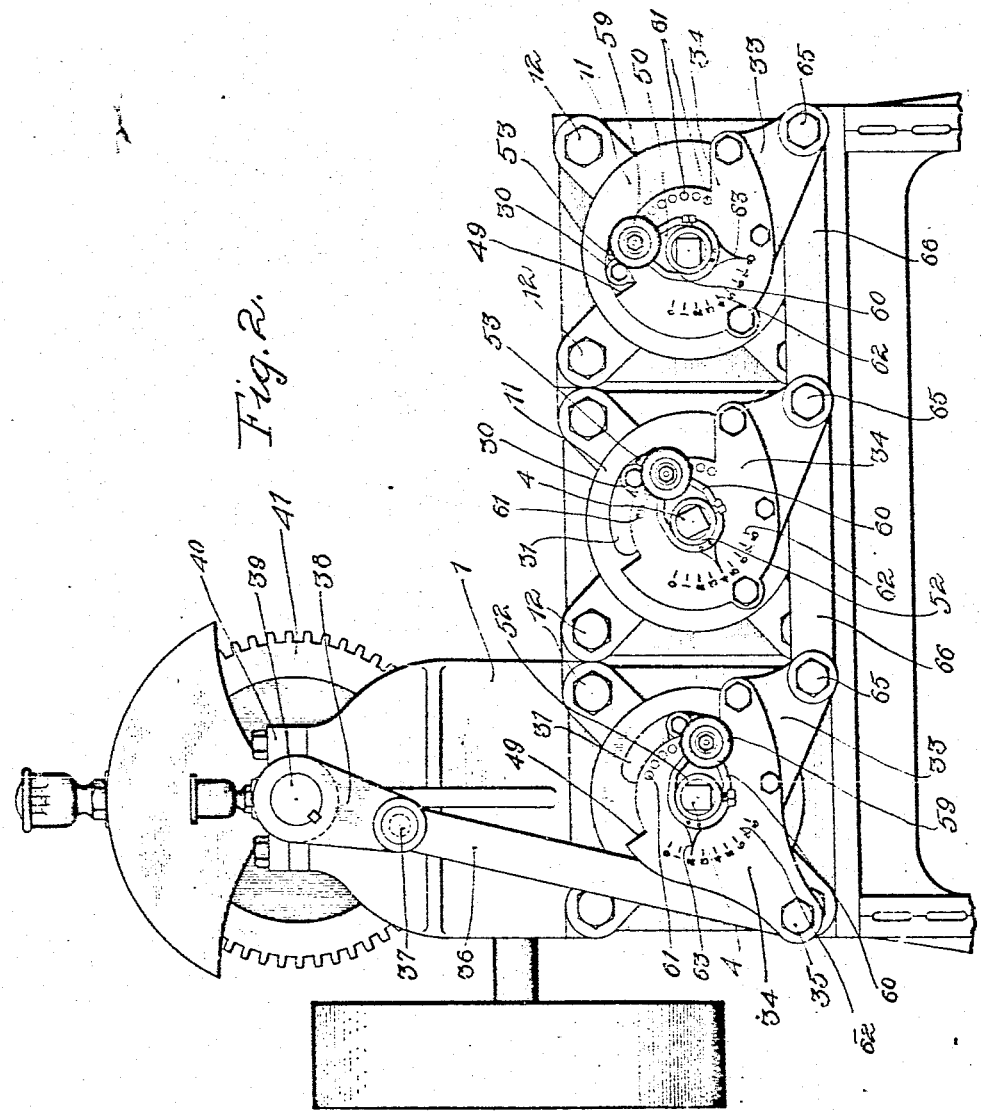

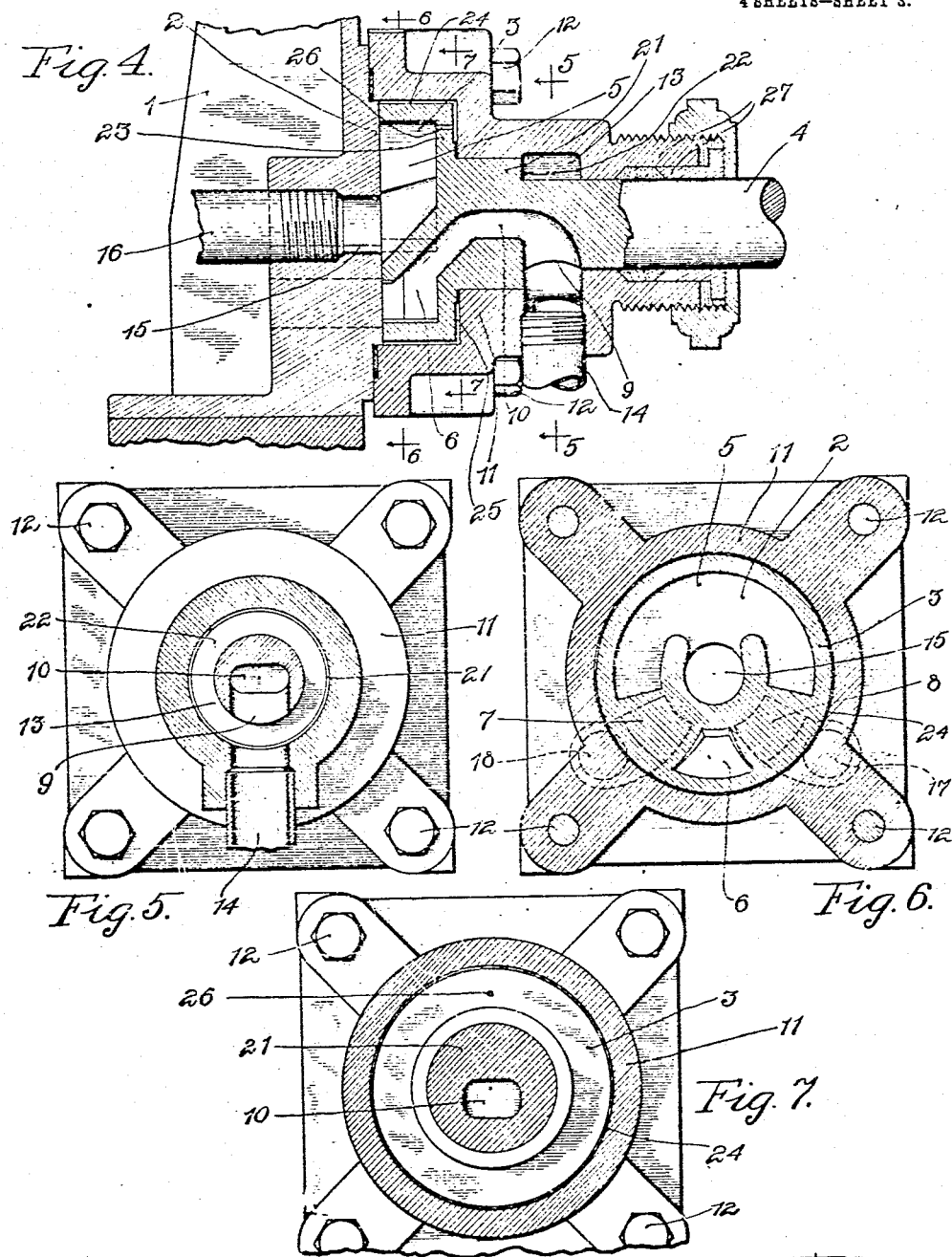

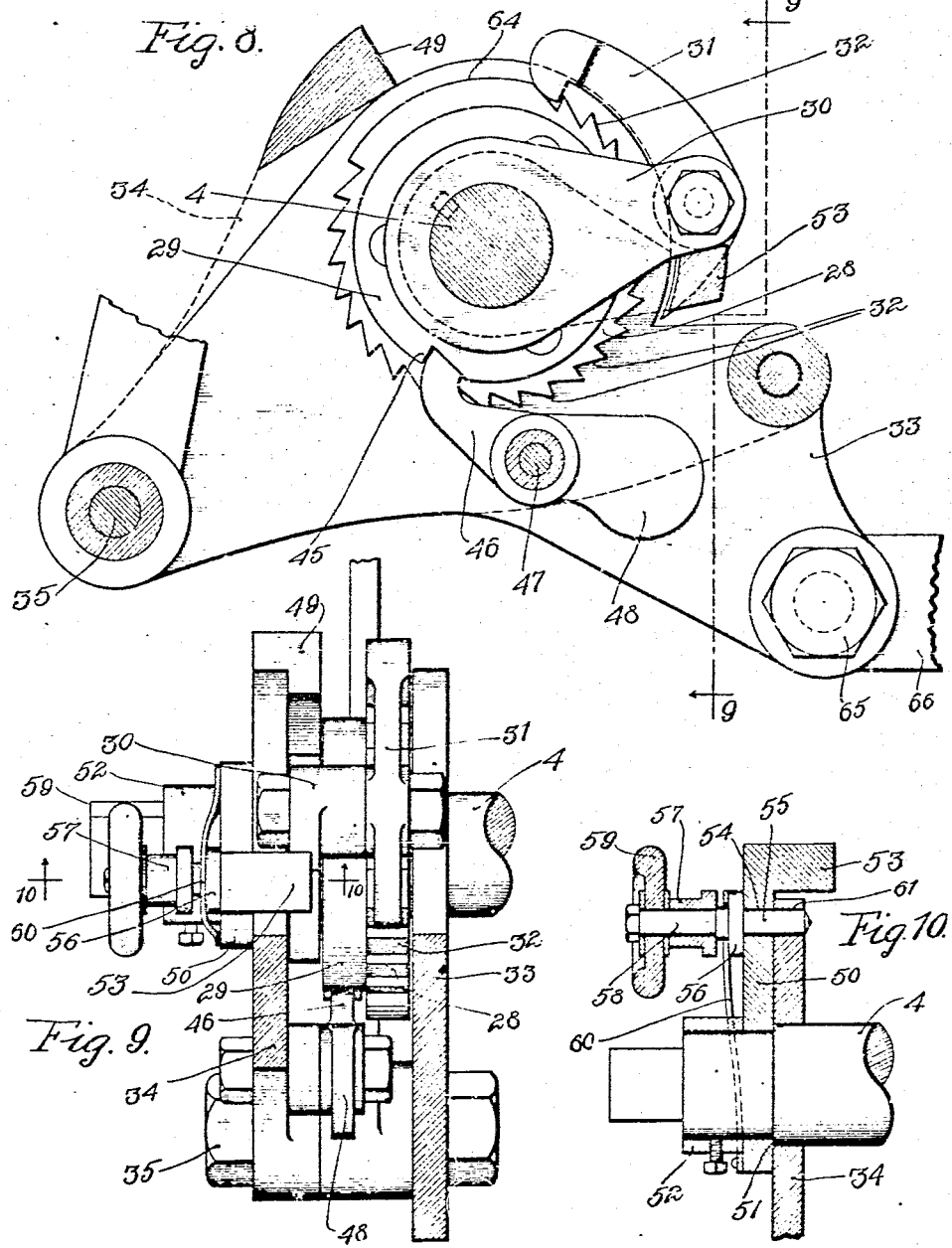

UNITED STATES PATENT OFFICE.

JOHN M. ROE, OF CHICAGO, ILLINOIS, ASSIGNOR TO UNDER-FEED STOKER COMPANY OF AMERICA, OF CHICAGO, ILLINOIS, A CORPORATION OF NEW JERSEY.

VALVE-CONTROLLING MECHANISM.

951,340.  Specification of Letters Patent.  Patented Mar. 8, 1910.

Application filed October 1, 1906. Serial No. 336,931.

*To all whom it may concern:*

Be it known that I, JOHN M. ROE, citizen of the United States, residing at Chicago, in the county of Cook and State of Illinois, have invented a certain new and useful Improvement in Valve-Controlling Mechanism, of which the following a full, clear, concise, and exact description, reference being had to the accompanying drawings, forming a part of this specification.

My invention relates to valve controlling mechanism which is of particular adaptability in steam operated stokers.

My invention may be considered as an improvement over the valve controlling mechanism disclosed in Patent No. 782,269 granted February 14, 1905 to A. A. Ramsdell. With the arrangement shown in this patent it is impossible to know what is the position of the valve at any time or what its adjustment is. A ratchet wheel is here shown, secured to the valve stem, and a pawl carried on a reciprocating frame engages the ratchet wheel and can be adjusted to rotate the valve stem through any arc during each reciprocation of the pawl supporting frame. There are no indicating means, however, from which the operator can ascertain the various movements or adjustment of the valve, and if the pawl should overthrow or miss during its operation, the adjustment of the valve would be deranged without the knowledge of the operator. The valve outlet upon advancement of the valve stem does not always come to rest directly over the port openings and sometimes merely passes over them, thus interfering with the free and sufficient passage of steam to the stoker cylinder. Another disadvantage in this arrangement is that the valve is held against the valve seat under full pressure, thus putting a severe strain on the valve driving mechanism as well as causing rapid wearing away of the valve seat.

The object of my invention is to provide means whereby the valve operation and movements will be indicated and can be ascertained at any time. Provision is made to cause the valve outlet to at all times come to rest directly in registration with the port openings and to remain in such position for a sufficient length of time to give sufficient time for the passage of steam to the stoker cylinder. Provision is also made for removing the full pressure from the valve and retain only sufficient pressure thereon to insure seating thereof.

My improvements will be better understood when described with reference to the accompanying drawings, in which—

Figure 1 is an end or side view of the valve mechanism; Fig. 2 is a front view thereof, showing the various valves connected together for simultaneous operation; Fig. 3 is a rear view, showing the exhaust outlet and the port openings, a stoking mechanism being also shown whose connection with the port openings is indicated by dotted lines; Fig. 4 is an enlarged diametrical view of one valve mechanism; Fig. 5 is a sectional view taken on line 5—5 of Fig. 4; Fig. 6 is a sectional view taken on line 6—6 of Fig. 4; Fig. 7 is a sectional view taken on line 7—7 of Fig. 4; Fig. 8 is an enlarged view of the valve driving mechanism with the front wheel removed therefrom; Fig. 9 is a sectional view taken on line 9—9 of Fig. 8; and Fig. 10 is a sectional view taken on line 10—10 of Fig. 9.

The upright frame 1 at its lower end provides a valve seat 2 against which rests the valve 3, from which extends the valve stem 4. The construction of this valve is best shown in Fig. 6, the valve being a cylindrical casting, having an exhaust chamber 5 and an outlet chamber 6 separated from the exhaust chamber by the partitions 7 and 8. The outlet chamber 6 connects with opening 9 through the channel 10 leading through the valve stem. The valve cap 11 engages over the valve and about its seat and is secured to the frame 1 by bolts 12, 12. In this cap there is an annular chamber 13 registering with the opening 9, and a pipe 14 leading from this annular chamber is connected with the boiler. Through the frame 1 and leading to the exhaust chamber is the passageway 15, from which extends the exhaust pipe 16. As best shown in Fig. 3, there are also two ports 17 and 18 extending from the frame 1, disposed to successively communicate with the outlet chamber 6 upon rotation of the valve. The port 17 is illustrated as being connected with the front of the stoker cylinder 19 while the port 18 is represented as being connected with the rear end of the stoker cylinder, and therefore, as the valve is rotated, steam is successively admitted to the front and rear of the cylinder, and the charging plunger 20 thereof is actuated to force fuel into the furnace with which the stoker is associated in a manner already known to the art. Between the stem proper and the valve is a portion 21 of greater diameter than the stem which affords a shoulder or ledge 22 subjected to the pressure of the steam in the annular chamber 13, and there is, therefore, a tendency to force the valve against its seat. The steam, however, is led directly to the seat through the passageway 10, and the reaction of the steam against the head 23 of the valve causes pressure tending to move the valve away from its seat. The adjustment of the surfaces, however, is such that the pressure tending to hold the valve on the seat predominates just sufficiently to insure proper seating of the valve. With this arrangement, the valve is practically floated by the steam, and practically no power will be required to cause rotation thereof. A clearance space 24 is maintained between the cylindrical surface of the valve and the cap, while a clearance space 25 is maintained between the top of the valve and the cap, a small passageway or vent 26 connecting the clearance space 25 with the exhaust chamber. This vent allows the escape of water which may leak between the valve cover and the part 21 into the clearance spaces. If water were allowed to accumulate in the clearance spaces, the back pressure of the steam against the valve would be nullified, and the valve would then be forced against its seat by the full pressure of the steam. The clearance spaces also come into play when the valve is suddenly pulled away from its seat, as might be the case when the valve driving mechanism is being adjusted. As soon as the valve leaves its seat any distance, steam immediately rushes through the clearance 24 and into the clearance space 25 and immediately forces the valve back against its seat.

The valve stem passes through the stuffing box 27 and near its end carries the ratchet disk 28 and another ratchet disk 29, both disks being secured to the stem. Loosely mounted on the valve stem in front of the disk 29 is a frame 30 to which is pivoted a pawl 31 for engaging with the teeth 32 of the ratchet disk 28. Loosely mounted on the stem are also the members or crank frames 33 and 34 connected together at their crank ends by the crank pin or bolt 35, to which is pivoted the lower end of the crank rod 36 whose upper end engages the crank pin 37 extending from the crank arm 38, secured to the end of the shaft 39 which is journaled in the horizontal bearing 40, extending from the front of the supporting frame 1. At the other end of this shaft at the rear side of the supporting frame 1 is secured the worm wheel 41 which meshes with a worm 42, secured to the shaft 43 and journaled in suitable bearings extending from the frame 1, and mounted at its end is a driving wheel 44 which may be connected by bolt or other means with a driving source, usually a steam engine driven by the steam generated in the boiler with which the stoker to be controlled is associated. The ratchet disk 29 has only one tooth 45, and a pawl 46 is pivoted on the pin 47 extending from the crank frame 33. This pawl is always below the ratchet disk 29 and has a weighted tail 48 whereby its end 46 is held against the surface of the disk 29, and when the tooth 45 comes in proper position, it will be engaged by the pawl, whereafter upon oscillation of the crank frames the disk 29 and valve stem will be rotated. The body part of the crank 34 is substantially circular and has a section cut away from its periphery to leave a stationary abutment 49, which abutment extends inwardly a distance in order to engage with the end of the arm or frame 30 carrying the pawl 31. Pivoted to the valve stem just outside the crank frame 34 is a frame or arm 50 held between the shoulder 51 on the valve stem and a collar 52 secured to the valve stem. Extending inwardly from the end of this frame or arm is an abutment 53, also in the path of the end of the pawl frame 30. Near the end of the frame 50 is an opening 54 through which extends a pin 55 having a collar 56. Another collar 57 is mounted on the reduced end 58 of the pin, and at the end of the reduced end is secured a knob or wheel 59. Secured to the hub of the frame 50 is a spring frame 60, best shown in Figs. 2, 9 and 10, whose end engages in the groove between the collars 56 and 57, the spring tending to hold the collar 56 against the frame 50 and the pin 55 in the opening 54. Through the crank frames 33 are a plurality of openings 61 disposed in an arc concentric with the valve stem and having a diameter to easily receive the end of the pin 53. The pin 53 is intended to pass through the opening 54 and through one of the openings 61, and upon pulling of the knob 59, the pin may be withdrawn from the engaged opening 61 against the force of the spring frame, and by turning the frame 50, the pin end may be brought into position before any other opening 61, and upon releasing of the knob, the spring frame will force the pin into the registering opening 61. The stationary abutment 49 is always at one side of the pawl frame end while the adjustable abutment 53 is at the other side of this frame, and upon adjusting the abutment 53 with respect to the crank frame 33, the amount of oscillation of the pawl frame 30 upon the oscillation of the crank frames is determined.

Looking at Figs. 2 and 8, when the connecting rod 36 is moved down upon rotation of the crank 38, the adjustable abutment 53 engages the pawl frame 30 and moves the pawl toward the left over a number of teeth determined by the adjustment of the pawl frame with respect to the crank frame 33. When the connecting rod is moved upwardly, the stationary abutment strikes the pawl frame 30 and the pawl is returned by the rod, and as the arcs traveled by the abutments are equal, the pawl frame will be returned to its normal position, the ratchet disk 28 and the valve stem being rotated to the right through an arc, depending upon the number of teeth that the pawl passed over when the pawl frame was moved toward the left by the adjustable abutment. The number of teeth traveled over by the pawl when moved by the adjustable abutment and the consequent amount of rotation of the valve stem upon the return of the pawl by the stationary abutment is determined by the relative adjustment between the abutment frame 50 and the crank frame 34. On the outside of the crank frame 34 are scale indications 62, indicating numbers of teeth, and on the spring frame 60 is a pointer 63 for coöperating with the scale. When the frame 50 has been adjusted and the pin 55 set in a particular hole 61, the pointer 63 will indicate on the scale the number of teeth which were traveled over by the pawl 31, and the subsequent arc of rotation of the valve stem, can, therefore, at any time be determined.

As before stated, there is only one tooth on the pawl disk 29, and the position of this tooth is such that the pawl 46 will be in engagement therewith when the valve outlet is in position over, and in registration with the port opening 18 connected with the front end of the cylinder of the stoker. The crank radius of the crank frames and the crank radius of the arm 38 are so adjusted that the oscillation of the crank frames will be through an arc equal in length to the arc adjoining the port openings. The adjustment is also such that when the pawl 46 comes into engagement with the tooth 45, the connecting rod and crank frames will be in their lowermost position. Now, when the crank disks move to their upper position, the disk 29 engaged by the pawl 46 is rotated, and the valve stem to which the disk is secured is also rotated and the valve moved with the stem to carry its port outlet into position over and in register with the port 17 leading to the other end of the cylinder 19. When the crank frames are again moved to their lower position, the pawl 46 is carried away from the tooth 45, and the adjustable abutment 53 engages the pawl frame 30 and moves the pawl toward the left over a number of teeth for which the adjustment is set, and upon return of the crank frames to their upper position, the stationary abutment engages the pawl frame to return the pawl to its normal position and thereby causing a rotary advancement of the valve stem to which the ratchet wheel 28 is secured. The valve is thus moved by steps or advancements until the valve outlet again comes into position in registration with the port 18. As will be noticed by examining Fig. 8, the part 64 of the ratchet disk 28 has no teeth, and during the last movement toward the left of the pawl to subsequently carry the valve outlet to the port 18, the pawl engages on this toothless surface, and when the pawl is returned to the right, it passes over a section of the toothless part, and during this time causes no rotation of the ratchet wheel and valve, but during the end of this return movement, the pawl engages the first tooth on the disk and at the end of the oscillation of the crank frame, the ratchet disk 28 will have been moved to bring the valve opening into position in registration with the port 18. The valve outlet remains at rest with its outlet in full communication with the port 18 during the downward movement of the crank frames to carry the pawl 46 into engagement with the tooth 45 which is now in proper position for such engagement. The steam, therefore, has ample time to flow through the valve mechanism to the cylinder 19 and perform its functions. When the crank frames again move to their upper position, the disk 29 engaged by the pawl 46 is rotated and the valve also rotated, to carry its outlet over the port 17, as before described. The valve remains at rest with its outlet over the port 17 during the time that the pawl is carried by the adjustable abutment over the ratchet disk 28, and the valve is then given advancement to close the port 17 when the pawl is returned to its normal position carrying with it the disk 28, and the valve, as before described, is then angularly advanced by steps until this outlet again registers with the port 18, this cycle of operation so being repeated.

From the above construction, it can readily be seen that the disadvantages pointed out in the mechanism shown in the Ramsdell patent referred to are entirely eliminated. The valve by coming to rest with its outlet in full register with the ports allows a sufficient flow of steam and ample time for the proper operation of the stoker mechanism by the steam. By means of the adjustable abutment and the scale indication, the attendant can ascertain the exact speed of operation of the valve and can adjust it to any desired value. The operation and position at any time of the valve are, therefore, just as clear to the attendant as though he could actually see the valve. Also by virtue of the arrangement of the valve whereby it is practically floated by the steam, the power necessary to drive the valve mechanism is practically negligible, and there is practically no wear on the operating parts.

As shown in Fig. 2, a plurality of valves may be driven from a single crank shaft and connecting rod. The valves to any number are suitably mounted in a row, as shown. The crank members 33 and 34 of each valve mechanism are further connected together by a pivot pin 65, and a connecting rod 66 engages all these pivot pins, whereby the oscillations of the crank members connected with the connecting rod are transmitted to the crank members of the other valve mechanisms. Although these oscillations are the same, the advancements or increments of rotation of the different valves need not be alike. Each valve mechanism may be adjusted, as desired, to cause any rate of operation of the stoker mechanism connected therewith.

I do not wish to be limited to the exact constructions and arrangement herein disclosed, as I am aware that many changes and modifications may be made which will still come within the scope of my invention.

What I desire to secure by Letters Patent are the following claims.

1. In combination, a rotary valve having an outlet, a valve seat having two separate ports disposed in the path of said outlet, mechanism for advancing said valve step by step through one of the arcs connecting said ports and finally bringing it to rest with said outlet in registration with one of said ports regardless of the length of the individual steps through which said valve is moved, a device associated with said mechanism for varying the length of said steps, mechanism arranged to advance said valve positively through the other arc connecting said ports so as to bring said outlet into registration with the second of said ports, and means for actuating said mechanism.

2. In combination, a rotary valve having an outlet, a valve seat having two separate ports disposed in the path of said outlet, mechanism for advancing said valve step by step through one of the arcs connecting said ports and finally bringing it to rest with said outlet in registration with one of said ports regardless of the length of the individual steps through which said valve is moved, a device associated with said mechanism for varying the length of said steps, mechanism arranged to advance said valve positively through the other arc connecting said ports by a single movement so as to bring said outlet into registration with the second of said ports, and means for actuating said mechanism.

3. In combination, a rotary valve having an outlet, a valve having two separated ports disposed in the path of said outlet, mechanism arranged to advance said valve through one of the arcs connecting said ports, said mechanism being constructed and arranged to advance said valve step by step to a point wherein the outlet is removed from one of said ports a distance equal to, or less than one of such steps and then bring said outlet into registration with the latter port, a device associated with said mechanism for varying the length of said steps, mechanism for actuating said valve through the other arc connecting said ports, and means for actuating said mechanisms.

4. In combination, a rotary valve having an outlet, a seat for the valve having two port openings disposed in the path of the outlet, means for causing angular advancements of the valve, means for adjusting the length of the angular advancements, means for causing the outlet to be carried into exact register with one of the port openings after a series of angular advancements, and means for causing direct angular advancement of the valve to carry the outlet directly into engagement with the other port opening.

5. In combination, a rotary valve having an outlet, a seat for the valve having two port openings disposed in the path of the outlet, a rocking frame, a pawl on said rocking frame, a ratchet wheel connected with the valve and coöperating with said pawl, means for rocking said frame for causing continued oscillations of said frame to reciprocate said pawl through a path equal in length to the polar distance between the port openings, an additional ratchet wheel connected with the valve, an additional pivoted frame, an additional pawl pivoted to said additional frame, adjustable abutment mechanism carried by the first frame for engaging with the additional frame to cause coöperation of the additional pawl with the additional ratchet wheel, said first pawl and ratchet wheel causing the valve outlet to be carried directly from one port opening to the other, and said second pawl and ratchet mechanism coöperating to return the outlet to the first port opening.

6. In valve mechanism, the combination of a rotary valve having an outlet, a seat for the valve having two port openings disposed in the path of the outlet, means for causing one angular advancement of the valve during each complete revolution thereof to carry the outlet from one port opening to the other, means for causing a series of advancements during the remaining part of the revolution to return the outlet to the first engaged port opening, means for maintaining constant the length of the first angular advancement, and means for adjusting the length of the advancements of the series.

7. In valve mechanism, the combination of a rotary valve having an outlet, a seat for the valve having two port openings disposed in the path of the outlet, means for causing one angular advancement of the valve during each complete revolution thereof to carry the outlet from one port opening to the other, means for causing a series of advancements during the remaining part of the revolution to return the outlet to the first engaged port opening, means for maintaining constant the length of the first angular advancement, means for adjusting the length of the advancements of the series, and means for causing the outlet to come into exact register with the first port opening after each series of advancements.

8. In valve mechanism, the combination of a rotary valve having an outlet, a seat for the valve having two port openings disposed in the path of the outlet, said outlet being normally in connection with one of the port openings, means for causing one angular advancement of the valve during each complete revolution thereof to carry the outlet directly from said first port opening to the second port opening, means for causing a series of advancements of the valve to return the outlet toward the first port opening, means for adjusting the length of the series of advancements, and means for adjusting the last angular advancement of the series to cause the outlet to come into exact register with the first port opening.

9. In valve mechanism, the combination of a rotary valve having an outlet, a seat for the valve having two port openings disposed in the path of the outlet, a frame pivoted concentric, a pawl carried by said frame, a one-tooth ratchet wheel coöperating with said pawl and connected with the valve means for causing continued rocking of said frame through a polar angle equal to the polar angle between the port openings, said tooth and pawl being so disposed that when in engagement the valve outlet will be carried from one port opening directly to the other, an additional frame pivoted concentric with the valve, an additional pawl carried by said frame, an additional ratchet wheel coöperating with said pawl and connected with the valve, abutments on said frame coöperating with the additional frame to control angular reciprocation thereof upon reciprocation of the main frame, reciprocation of the additional frame causing the additional pawl and ratchet mechanism to coöperate to cause step by step advancements of the valve to restore the outlet to the first port opening, and a cam surface carried by the additional ratchet wheel for adjusting the length of the last angular advancement by the additional pawl and ratchet mechanism to cause the outlet to come into exact register with the first port opening.

10. In valve mechanism, the combination of a rotary valve having an outlet, a seat for the valve having port openings disposed in the path of the outlet, a frame pivoted concentric with the valve, means for causing continued uniform angular reciprocation of said frame, an additional frame pivoted concentric with the valve, a pawl carried by said frame, a ratchet wheel connected with the valve and coöperating with the pawl, and adjustable abutments on said main frame coöperating with the additional frame to adjust the length of the angular advancements of the valve.

11. In valve mechanism, the combination of a rotary valve having an outlet, a seat for the valve having port openings for connecting with said outlet, a main frame pivoted concentric with the valve, means for reciprocating said frame through a constant polar angle, an additional frame pivoted concentric with the valve, a pawl carried by said frame, a ratchet wheel secured to the valve and coöperating with said pawl, abutments on the main frame engaging with the additional frame to cause angular reciprocation thereof upon angular reciprocation of the main frame whereby said valve is given angular advancements, means for adjusting said abutments to cause the angle of the valve advancements to be smaller than the angle of reciprocation of the main frame.

12. In valve mechanism, the combination of a rotary valve having an outlet, a seat for the valve having port openings for connecting with said outlet, a main frame pivoted concentric with the valve, means for reciprocating said frame through a constant polar angle, an additional frame pivoted concentric with the valve, a pawl carried by said frame, a ratchet wheel secured to the valve and coöperating with said pawl, abutments on the main frame engaging with the additional frame to cause angular reciprocation thereof upon angular reciprocation of the main frame whereby said valve is given angular advancements, means for adjusting said abutments to cause the angle of the valve advancements to be smaller than the angle of reciprocation of the main frame, and an additional pawl and ratchet mechanism adapted to cause advancements of the valve through angles equal to the angle of reciprocation of the main frame.

13. In valve mechanism, the combination of a rotary valve having an outlet, a seat for the valve having port openings adapted to connect with said outlet, a main frame pivoted concentric with the valve, means for causing polar reciprocation of said main frame through a constant polar angle, a pawl carried by said frame, a ratchet wheel connected with the valve and coöperating with said pawl to cause angular advancements of the valve, an additional pawl carried by said frame, an additional ratchet wheel connected with the valve for coöperating with said additional pawl, abutments on the main frame for engagement with the additional frame to cause angular reciprocation thereof and therefore angular advancements of the valve upon reciprocation of the main frame, and means for adjusting said abutments to adjust the angle of said advancements by the additional pawl and ratchet mechanism.

14. In valve mechanism, the combination of a rotary valve having an outlet, a seat for the valve having port openings adapted to connect with said outlet, a main frame pivoted concentric with the valve, means for causing polar reciprocation of said main frame through a constant polar angle, a pawl carried by said frame, a ratchet wheel connected with the valve and coöperating with said pawl to cause angular advancements of the valve, an additional pawl carried by said frame, an additional ratchet wheel connected with the valve for coöperating with said additional pawl, abutments on the main frame for engagement with the additional frame to cause angular reciprocation thereof and therefore angular advancements of the valve upon reciprocation of the main frame, means for adjusting said abutments to adjust the angle of said advancements by the additional pawl and ratchet mechanism, and means for causing said first pawl and ratchet mechanism to be effected once during each complete revolution of the valve, said outlet being carried directly between the port openings during the operation of said first pawl and ratchet mechanism and carried intermittently between the port openings during the operation of the additional pawl and ratchet mechanism.

In witness whereof, I hereunto subscribe my name this 28th day of September A. D., 1906.

JOHN M. ROE.

Witnesses:
 CHARLES J. SCHMIDT,
 ARTHUR H. BOETTCHER.